March 14, 1961  A. E. EDWARDS  2,974,486

AFTERBURNER MIXTURE AND FLAME CONTROL BAFFLE

Filed March 27, 1958

INVENTOR
ALFRED E. EDWARDS

BY Vernon F. Hauschild
ATTORNEY

2,974,486

AFTERBURNER MIXTURE AND FLAME CONTROL BAFFLE

Alfred E. Edwards, Manchester, Conn., assignor to United Aircraft Corporation, East Hartford, Conn., a corporation of Delaware Filed Mar. 27, 1958, Ser. No. 724,477

6 Claims. (Cl. 60—39.66)

This invention relates to combustion apparatus and more particularly to afterburner construction of the type used in modern aircraft turbojet engines.

It is an object of this invention to provide an afterburner construction in which the afterburner outer duct is provided with fuel free cooling air or gas throughout its length and in which a cooling liner, which is subjected to heat of combustion, receives fuel free cooling gas over both its internal and external surfaces and at various stations throughout its length.

It is an important object of this invention to provide a mixture and flame control baffle within the afterburner outer duct to form a cooling gas passage therebetween and which further forms a fuel-air mixing region with the afterburner inner body, which mixing region is sized to receive a selected flow quantity of fuel free engine gas which will be mixed with a selected flow quantity of fuel injected into the mixing region to form a substantially stoichiometric fuel-air mixture therewith. The fuel-air mixture flows through the mixing region and is burned with the aid of a flameholder which establishes a combustion wave which passes the mixture and flame control baffle after end in close proximity so that the cooling gas which passes external of the baffle and which is introduced into the afterburner interior at the baffle after end will mix with the heated gases caused by combustion of the stoichiometric fuel-air mixture solely, and not with the fuel-air mixture to dilute same to a point near or below its inflammability limit.

It is a further object of this invention to provide an afterburner construction which may be tailored without engine disassembly and in many instances with the afterburner assembled onto the engine, from external of the afterburner after end to match changes in engine characteristic and to vary the quantity of cooling gases provided to load-carrying parts which are subjected to intense heat. This tailoring feature also permits elimination of streaks and allows a higher average exhaust gas exit temperature thereby providing improved thrust augmentation.

It is a further object of this invention to teach an afterburner construction which provides an isolated and properly sized fuel-air mixing region thereby permitting optimum mixture control and which prevents the mixing of cooling gases with a fuel-air mixture by causing all combustion to occur upstream of the area where cooling gases are admitted to the combustion chambers.

Other objects and advantages will be apparent from the specification and claims, and from the accompanying drawings which illustrate an embodiment of the invention.

Figure 1:
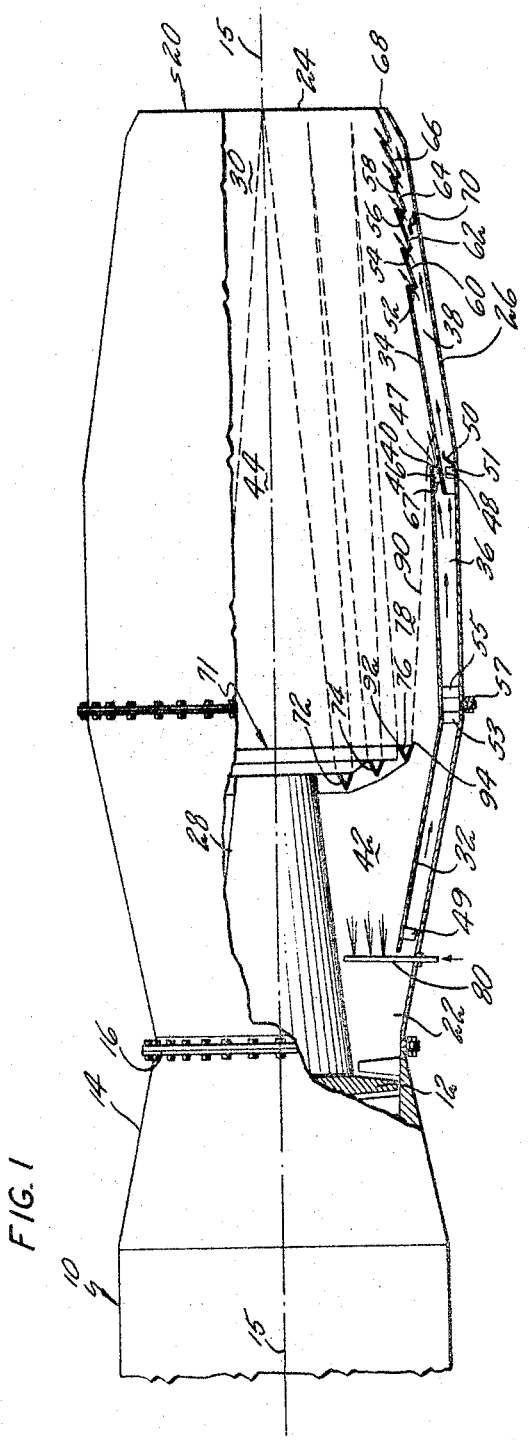
Fig. 1 is a fragmentary side view, partially in section, showing my afterburner construction in its environment.

Referring to Fig. 1 we see engine 10 which is preferably of the modern aircraft turbojet type which comprises a compressor, burner and turbine 12 aligned within an outer case of circular cross section 14, all of which are concentric about axis 15. The air which enters the engine at its forward, upstream or inlet end is compressed in passing through the compressor, is heated in passing through the burner and has energy extracted therefrom in passing through turbine 12, which energy is used to drive the compressor. After passing through turbine 12, the heated and compressed engine exhaust gases are then discharged through engine exhaust outlet 16, which defines the after end of outer case 14. Since jet engine construction is well-known, it is believed that the above description is sufficient for the present purpose and a more complete explanation may be had by referring to U.S. Patent Nos. 2,711,631 and 2,747,367.

Afterburner 20 is coaxially concentric with engine 10 about axis 15 and is attached to the exhaust outlet 16 of engine 10 to receive the heated and compressed exhaust gases therefrom. Afterburner 20 comprises an inlet end 22 which is attached to engine 10 and an outlet end 24 which communicates with atmosphere and through which the heated and compressed exhaust gases from engine 10, after passing through afterburner 20, are discharged to atmosphere to generate thrust. Afterburner 20 comprises outer duct 26 and inner body 28, both of which are of circular cross section and coact to define total gas flow passage 30, which passage is annular in shape for the length of inner body 28 and then becomes of circular cross section for the remainder of the length of outer duct 26. As will be seen from description hereinafter contained, total gas flow passage 30 comprises mixing region 42, combustion zone 44 and cooling gas passages 36 and 38. Mixture and flame control baffle 32 and cooling liner 34 are each of circular cross section and each is located concentrically within outer duct 26 and with liner 34 constituting a radially displaced, axial continuation of baffle 32 so that they form, respectively, a first cooling gas or cooling air annular passage 36 and a second cooling gas or cooling air annular passage 38 with the outer duct 26. Baffle 32 is divergent through at least a portion of its length and extends from afterburner inlet end 22 and extends rearwardly therefrom for a portion of the length of afterburner duct 26 and terminates at after end 40. Baffle 32 is of selected diameter with respect to the diameter of outer duct 26 and the diameter of convergent inner body 28 so as to coact with each to form a first annular cooling gas passage 36 and divergent mixing region 42, respectively, therewith of selected size so that each receives a selected amount of the heated, compressed and fuel free exhaust gases passed into afterburner inlet 22 from engine 10. The total quantity of exhaust gas to be passed into afterburner 20 from engine 10 during normal engine operating conditions is known so that by properly selecting the size of mixing region 42 and first cooling gas passage 36, the amount of fuel free engine gas which will flow through each at normal engine operating conditions can be selected.

The fuel free cooling gas which passes through first cooling gas passage 36 serves to cool baffle 32. After passing through the first cooling gas passage 36, this fuel free cooling gas divides into two portions, the first of which flows rearwardly into combustion zone 44 which is located within and defined by cooling liner 34 to pass along the inner surface thereof to cool cooling liner 34 by diluting the heated gases of combustion passing therealong in combustion zone 44. Separating means 46, which may be of any convenient type such as circumferentially spaced U-shaped spacers or a circumferential wave ring, serves to define an annular passage 47 between the after end 40 of baffle 32 and the forward end 48, which annular passage 47 is directed in a downstream or substantially axial direction and permits the flow of the aforementioned first portion of cooling gas from passage 36 to enter combustion chamber 44 therethrough. The second portion or remainder of the cooling air from passage 36 enters second annular cooling gas passage 38 through flow regulating baffle 50 and serves to cool the outer surface of cooling liner 34 and eventually divides into two portions. The first of the last-mentioned two portions flows through any of the plurality of rearwardly or downstream directed perforations 52, 54, 56 and 58, which are spaced circumferentially about circumferentially extending and overlapping contoured rings 60, 62, 64 and 66, while the remainder or second portion flows through annular outlet 68 defined between cooling liner 34 and outer duct 26 at the afterburner outlet end 24.

The cooling gas or air which passes through first and second cooling gas passages 36 and 38 serve to cool baffle 32 and cooling liner 34 while the cooling gas which enters combustion chamber 44 through passage 46 and perforations 52, 54, 56 and 58 provides inner surface cooling for cooling liner 34 at axially spaced stations along its length. Passage 46 and perforations 52, 54, 56 and 58 are formed to direct cooling gas immediately adjacent liner 34 only so that heated gas at maximum average temperature is discharged to atmosphere through afterburner outlet 24 to generate thrust.

Ring-type baffles 50 and 70 are permanent in nature and serve to control the amount of cooling gas passing therebeyond for cooling purposes as required by the particular afterburner configuration. In addition to these permanently installed flow regulating means, baffle after end 40 and perforations 52, 54, 56 and 58 are located with respect to afterburner after end 24 and are made of such material, preferably sheet metal, that they may be reoperated from external of said afterburner after end 24 to tailor the afterburner cooling and mixing qualities to suit changes in the operating characteristics of engine 10 brought about by such things as changes in the number of compressor and turbine stages, etc. This cooling gas flow tailoring may be accomplished by locally deforming passage 46 or perforations 52, 54, 56 and 58, and by inserting temporary flow dams such as 67, for example. The amount of cooling effect provided to the afterburner parts is important to the durability of these parts while the amount of mixing between cooling and heated gases is important for efficiency reasons, for example, in providing approximately a square exhaust gas temperature profile to the exhaust gases passing to atmosphere through afterburner outlet end 24. Further, due to the presence of stationary objects such as supports within the afterburner, low pressure regions are formed downstream of these stationary objects which frequently cause a narrow, axially extending zone for the length of the afterburner which operates at a higher temperature than the remainder of the afterburner, and this phenomenon, known as "hot streaks" to those skilled in the art, subjects parts such as cooling liner 34 to intense heat in localized areas. When this occurs, the after end 40 of baffle 32 can be reoperated locally to provide a greater amount of cooling air along the path of this "hot streak" to prevent part destruction. This local reoperation may be accomplished, for example, by locally increasing passage 46 by a person standing behind afterburner outlet 24 and forcing a crow bar type instrument between the after end 40 of baffle 32 and baffle 34.

Figure 2:
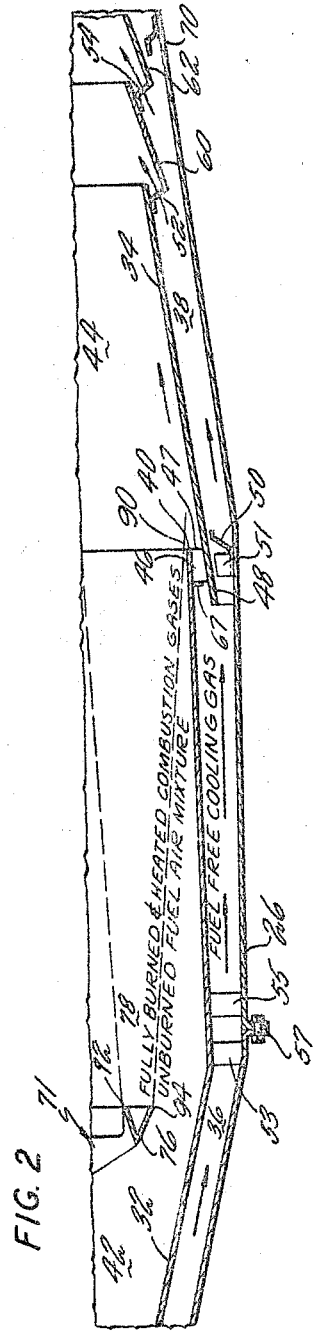
Fig. 2 is an enlarged, partial showing of the Fig. 1 configuration to illustrate the relationship between the flameholder and the mixture and flame control baffle after end in greater particularity.

As mentioned supra, baffle 32 serves to define a divergent mixing region 42 of selected size with inner body 28, which mixing region intercepts and therefore receives a selected quantity flow of fuelless gas from engine 10 which passes therethrough into combustion zone 44. A flameholder unit 71 which comprises at least one flameholder ring such as 72, 74 and 76, which are preferably trough-shaped rings of the type more completely described in U.S. Patent No. 2,702,452 and which are supported in any convenient fashion, for example from outer duct 26 or, as shown, from inner body 28 and, are positioned to intercept the gases flowing through mixing region 42 and establish a relatively stagnant flow zone such as is shown at 78 with respect to flameholder 76 to permit supported combustion downstream of the flameholder. Fuel injection means such as a plurality of radially directed and circumferentially spaced fuel spray bars 80 are positioned at the forward or upstream end of baffle end 32 to inject a predetermined quantity flow of atomized fuel into mixing region 42 to mix with the aforementioned selected quantity flow of engine fuel free gases passing therethrough and form a substantially stoichiometric unburned fuel-air mixture as the selected fuel and air flow quantities flow through divergent mixing region 42 to eventually be intercepted by flameholder unit 71. The fuel-air mixture is initially ignited in any convenient fashion such as by a spark plug or shot gun blast projecting into stagnant zone 78 or by a remote hot streak ignitor of the type taught in U.S. Patent Nos. 2,780,054 and 2,780,055, to cause combustion of the aforementioned stoichiometric fuel-air mixture downstream of flameholder unit 71. It will be noted that baffle 32 serves as a boundary, barrier or interface between the aforementioned fuel-air mixture which flows internally thereof and the fuel free cooling gas which flows externally thereof through passage 36. In practice, each flameholder ring, such as 76, sets up a combustion wave such as 90 downstream thereof which combustion wave constitutes a boundary or interface between the aforementioned unburned fuel-air mixture upstream thereof and the heated and burned gases of combustion downstream thereof caused by the combustion of the aforementioned fuel-air mixture in passing through the combustion wave in which the actual combustion occurs. Since the flameholder rings such as 76 are shaped as rings concentric about axis 15, all combustion waves are of circular cross section and project as shown from each edge such as 92 and 94 of flameholder ring 76 and each is an area of extreme heat since the combustion actually occurs as the stoichiometric fuel-air mixture passes through this combustion wave. The outermost combustion wave 90 is of particular concern due to its proximity to the afterburner parts such as baffle 32, cooling liner 34 and outer case 26. If combustion wave 90 were to come into direct contact with any of these sheet metal parts, the part durability would be seriously impaired and therefore it is important that cooling air be provided to protect the parts. If this cooling air is released into combustion chamber 44 upstream of combustion wave 90, it will dilute the stoichiometric fuel-air mixture to near or below its inflammability limit so that unburned fuel will be wasted in passing through the afterburner. Accordingly, it is an important teaching of this invention to position flameholder unit 71 with respect to baffle after end 40 so that combustion wave 90 passes immediately adjacent baffle after end 40 so that optimally no fuel-air mixture passes therebetween (see Fig. 2) so that the cooling gases from passage 36 which pass through annular passage 46 are introduced solely to the heated and burned gases located downstream of combustion wave 90 caused by the combustion of the stoichiometric fuel-air mixture in passing through combustion wave 90. This is accomplished by causing the interface defined by baffle 32 between the unburned stoichiometric fuel-air mixture of mixing region 42 and the fuel free cooling gases passing through passage 46 to intersect with the interface defined by combustion wave 90 between the unburned stoichiometric fuel-air mixture flowing through mixing region 42 and the heated and burned gases caused by the combustion thereof, immediately downstream of baffle after end 40.

Liner 34 and baffle 32 may be finely perforated for at least a portion of their length for screech abatement purposes.

Baffle 32 and liner 34 are attached by the circumferentially spaced U-shaped spacers or wave ring 46 that defines annular passage 47. Similar spacers 49 and 51 are used to support baffle 32 and liner 34 from outer duct 26 at the forward end of cooling passages 36 and 38, respectively. Additional support stations 53 and 55 at the flange connection 57 joining mixing region 42 and combustion zone 44 are used for attachment of baffle to outer duct 26.

It is to be understood that the invention is not limited to the specific embodiment herein illustrated and described but may be used in other ways without departure from its spirit as defined by the following claims.

I claim:

1. A jet engine having an axis and an outer case of circular cross section through which heated and compressed gases are passed and further having an inner body of circular cross section but of less diameter than said outer case and being concentric about said axis and projecting rearwardly from said engine beyond said outer case, an afterburner having an outer duct of circular cross section attached to said engine outer case to receive engine exhaust gases therefrom and to coact with said inner body to define a total gas flow passage which is annular for the length of said inner body and of circular cross section downstream thereof, a baffle of circular cross section positioned between said inner body and said outer duct and being of selected diameter to define a mixing region of given size with said inner body and to further define a cooling gas passage within said total gas flow passage and of given size with said outer duct so that both said mixing region and said cooling gas passage receive a selected quantity of fuel free gas from said engine during normal engine operation, said baffle extending a predetermined distance downstream within said outer duct and terminating in an after end which defines with said outer duct an admission area for cooling gas from said cooling gas passage to the remainder of said total gas flow passage downstream of said baffle, means to inject atomized fuel into said mixing region in predetermined quantities to form an unburned, substantially stoichiometric fuel-air mixture flowing through said mixing region with said given quantity of gas received by said mixing region from said engine so that said baffle forms an interface between an unburned stoichiometric fuel-air mixture zone and said fuel free cooling gas, at least one flameholder ring located downstream of said fuel injection means and positioned to intercept said unburned stoichiometric fuel-air mixture flow and establish a relatively stagnant flow region capable of supporting combustion and further positioned a predetermined distance from said baffle after end so that when combustion occurs downstream of said flameholder said flameholder establishes a combustion wave which defines a second interface between the heated and burned gases downstream thereof resulting from combustion of said fuel-air mixture and the said unburned stoichiometric fuel-air mixture upstream thereof, means to position said flameholder ring a predetermined distance upstream of said baffle after end so that said second interface intercepts said first interface immediately adjacent said baffle after end so that said cooling gas from said cooling gas passage mixes solely with said heated and burned gases resulting from combustion of said fuel-air mixture and not with a fuel-air mixture.

2. A jet engine having an axis and an outer case of circular cross section through which heated and compressed gases are passed and further having an inner body of circular cross section but of less diameter than said outer case and being concentric about said axis and projecting rearwardly from said engine beyond said outer case, an afterburner having an outer duct of circular cross section and having an inlet end attached to said engine outer case to receive engine exhaust gases therefrom and an outlet end communicating with atmosphere, said outer duct coacting with said inner body to define a total gas flow passage which is annular for the length of said inner body and of circular cross section downstream thereof, a baffle of circular cross section positioned between said inner body and said outer duct and being of selected diameter to define a mixing region of given size with said inner body and to further define a first cooling gas passage within said total gas flow passage and of given size with said outer duct so that both said mixing region and said first cooling gas passage receive a selected quantity flow of fuel free gas from said engine during normal engine operation, said baffle extending a predetermined distance downstream within said outer duct and terminating in an after end, a cooling liner of circular cross section defining a combustion zone and located within said outer duct to form a second cooling gas passage therewith within said total gas flow passage and extending from said baffle after end where said first and second cooling gas passages are in free communication to said outer duct outlet end and having perforations therein projecting downstream and placing said second cooling gas passage and said combustion zone into communication, separating means separating and defining a downstream directed passage between said baffle after end and said cooling liner and placing said first cooling gas passage into communication with said combustion zone so that a first portion of the cooling gas from said first cooling gas passage flows through said downstream directed passage downstream into said combustion zone along the inner surface of said cooling liner while a second portion flows into said second cooling gas passage from whence a first portion thereof flows through said downstream projecting perforations downstream into said combustion zone along the inner surface of said cooling liner while a second portion flows to atmosphere at said outer duct outlet end, means to inject atomized fuel into said mixing region in predetermined quantities to form a substantially stoichiometric unburned fuel-air mixture flowing through said mixing region with said given quantity of gas received by said mixing region from said engine so that said baffle forms a first interface between said unburned stoichiometric fuel-air mixture and said fuel free cooling gas in said first cooling gas passage, at least one flameholder ring located downstream of said fuel injection means and positioned to intercept said stoichiometric fuel-air mixture flow and establish a relatively stagnant flow region capable of supporting combustion and further positioned a predetermined distance from said baffle after end so that when combustion occurs downstream of said flameholder said flameholder establishes a combustion wave which defines a second interface between the heated and burned gases downstream thereof resulting from the combustion of said stoichiometric fuel-air mixture and the said unburned stoichiometric fuel-air mixture upstream thereof, means to position said flameholder ring a predetermined distance upstream of said baffle after end so that said second interface intercepts said first interface immediately adjacent said baffle after end so that said cooling gas from said cooling gas passages mixes solely with said heated and burned gases resulting from combustion of said fuel-air mixture and not with a fuel-air mixture.

3. A jet engine having an axis and an outer case of circular cross section through which heated and compressed gases are passed and further having an inner body of circular cross section but of less diameter than said outer case and being concentric about said axis and projecting rearwardly from said engine beyond said outer case, an afterburner having an outer duct of circular cross section and having an inlet end attached to said engine outer case to receive engine exhaust gases therefrom and an outlet end communicating with atmosphere, said outer duct coacting with said inner body to define a total gas flow passage which is annular for the length of said inner body and of circular cross section downstream thereof, a baffle of circular cross section positioned between said inner body and said outer duct and being of selected diameter to define a mixing region of given size with said inner body and to further define a first cooling gas passage within said total gas flow passage and of given size with said outer duct so that both said mixing region and said first cooling gas passage receive a selected quantity flow of fuel free gas from said engine during normal engine operation, said baffle extending a predetermined distance downstream within said outer duct and terminating in an after end, a cooling liner of circular cross section defining a combustion zone and located within said outer duct to form a second cooling gas passage therewith within said total gas flow passage and extending from said baffle after end where said first and second cooling gas passages are in free communication to said outer duct outlet end and having perforations therein projecting downstream and placing said second cooling gas passage and said combustion zone into communication and located near said outer duct outlet end, separating means separating and defining a downstream directed passage between said baffle after end and said cooling liner and placing said first cooling gas passage into communication with said combustion zone so that a first portion of the cooling gas from said first cooling gas passage flows through said downstream directed passage downstream into said combustion zone along the inner surface of said cooling liner while a second portion flows into said second cooling gas passage from whence a first portion thereof flows through said downstream projecting perforations downstream into said combustion zone along the inner surface of said cooling liner while a second portion flows to atmosphere at said outer duct outlet end, means to inject atomized fuel into said mixing region in predetermined quantities to form a substantially stoichiometric unburned fuel-air mixture flowing through said mixing region with said given quantity of gas received by said mixing region from said engine so that said baffle forms a first interface between said unburned stoichiometric fuel-air mixture and said fuel free cooling gas in said first cooling gas passage, at least one flameholder ring located downstream of said fuel injection means and positioned to intercept said unburned stoichiometric fuel-air mixture flow and establish a relatively stagnant flow region capable of supporting combustion and further positioned a predetermined distance from said baffle after end so that when combustion occurs downstream of said flameholder said flameholder establishes a combustion wave which defines a second interface between the heated and burned gases downstream thereof resulting from the combustion of said stoichiometric fuel-air mixture and the said unburned stoichiometric fuel-air mixture upstream thereof, means to position said flameholder ring a predetermined distance upstream of said baffle after end so that said second interface intercepts said first interface immediately adjacent said baffle after end so that said cooling gas from said cooling gas passages mixes solely with said heated and burned gases resulting from combustion of said fuel-air mixture and not with a fuel-air mixture, said cooling liner perforations and said separating means being in communication with and easily accessible from said afterburner outer duct outlet end.

4. A jet engine having an axis and an outer case of circular cross section through which heated and compressed gases are passed and further having an inner body of circular cross section and converging rearwardly and being of less diameter than said outer case and being concentric about said axis and projecting rearwardly from said engine beyond said outer case, an afterburner having an outer duct of circular cross section and having an inlet end attached to said engine outer case to receive engine exhaust gases therefrom and an outlet end communicating with atmosphere, said outer duct coacting with said inner body to define a total gas flow passage which is annular for the length of said inner body and of circular cross section downstream thereof, a baffle of circular cross section positioned between said inner body and said outer duct and being of selected diameter and diverging rearwardly to define an annular, divergent mixing region of given size with said inner body and to further define a first annular cooling gas passage within said total gas flow passage and of given size with said outer duct so that both said mixing region and said first cooling gas passage receive a selected quantity flow of fuel free gas from said engine during normal engine operation, said baffle extending a predetermined distance downstream within said outer duct and terminating in an after end, a cooling liner of circular cross section located within said outer duct to form a second annular cooling gas passage therewith within said total gas flow passage and converging rearwardly and extending from radially outboard of said baffle after end where said first and second cooling gas passages are in free communication to said outer duct outlet end to define an annular outlet therewith and having perforations therein projecting downstream and placing said second cooling gas passage and said combustion zone into communication, separating means separating and defining a downstream directed annular passage between said baffle after end and said cooling liner and placing said first cooling gas passage into communication with said combustion zone so that a first portion of the cooling gas from said first cooling gas passage flows through said downstream directed annular passage downstream into said combustion zone along the inner surface of said cooling liner while a second portion flows into said second cooling gas passage from whence a first portion thereof flows through said downstream projecting perforations downstream into said combustion zone along the inner surface of said cooling liner while a second portion flows to atmosphere through said annular outlet, means to inject atomized fuel into said divergent mixing region in predetermined quantities to flow rearwardly therein with said given quantity of gas received by said mixing region from said engine and diverge therewith to form a substantially stoichiometric unburned fuel-air mixture flowing through said mixing region therewith so that said baffle forms a first interface between said unburned stoichiometric fuel-air mixture and said fuel free cooling gas in said first cooling gas passage, at least one flameholder ring located downstream of said fuel injection means and positioned to intercept said stoichiometric fuel-air mixture flow and establish a relatively stagnant flow region downstream thereof capable of supporting combustion and further positioned a predetermined distance upstream of said baffle after end so that when combustion occurs downstream of said flameholder said flameholder establishes a combustion wave which defines a second interface between the heated and burned gases downstream thereof resulting from the combustion of said stoichiometric fuel-air mixture and the said unburned stoichiometric fuel-air mixture upstream thereof, means to position said flameholder ring a predetermined distance upstream of said baffle after end so that said second interface intercepts said first interface immediately adjacent said baffle after end so that said cooling gas discharged into said total gas flow passage from said cooling gas passages mixes solely with said heated and burned gases resulting from the combustion of said stoichiometric fuel-air mixture, and not with a fuel-air mixture, and flow blockage means to regulate the flow of cooling gas through said cooling gas passages.

5. An afterburner attachable to the downstream end of an engine to receive a given quantity flow of heated and pressurized gas therefrom during normal engine operation, said afterburner having an axis and an outer duct of circular cross section with an inlet end attachable to an engine and an outlet end communicating with atmosphere and through which the afterburner gases are discharged to atmosphere to generate thrust, an inner body located at said outer duct inlet end and extending therefrom toward said outer duct outlet end but terminating substantially short thereof and being of circular cross section and concentrically positioned within said outer duct and coacting with said outer duct to define a total gas flow passage which is annular for the length of said inner body and of circular cross section downstream thereof, a mixture and flame control baffle of circular cross section located between said inner body and said outer duct and being of selected diameter with respect thereto to define a fuel-air mixing region of selected size with said inner body and a cooling gas passage within said total gas flow passage of selected size with said outer duct so that selected quantity flows of fuel free gas are passed through said mixing region and said cooling gas passage during said normal engine operation, said baffle extending from said outer duct inlet end downstream a selected distance beyond said inner body and terminating in an after end, fuel injection means positioned to introduce atomized fuel into the inlet end of said mixing region in a predetermined quantity to mix with the fuel free gas passing through said mixing region and form an unburned substantially stoichiometric fuel-air mixture flowing through said mixing region so that said baffle defines a first interface between said unburned stoichiometric fuel-air mixture flowing through said mixing region and the cooling gas flowing through said cooling gas passage, at least one ring-type flame-holder positioned to intercept the flow of said unburned stoichiometric fuel-air mixture and establish a relatively stagnant area downstream thereof capable of supporting combustion and establish a combustion wave defining a second interface between the heated and burned gases resulting from the combustion of said stoichiometric fuel-air mixture and said unburned stoichiometric fuel-air mixture, means to position said flameholder a predetermined distance from said baffle after end so that said second interface intercepts said first interface immediately downstream of said baffle after end to insure that fuel introduced from said injection means adjacent to the baffle is burned upstream of the interception of said interfaces and so that the cooling gas which is passed into the remainder of said total gas flow passage from said cooling gas passage after end mixes with said heated and burned gases resulting from the combustion of said stoichiometric fuel-air mixture solely to provide a heated gas mixture with no unburned fuel to be discharged through said outer duct after end to atmosphere to generate thrust.

6. An afterburner attachable to the downstream end of an engine to receive a given quantity flow of heated and pressurized gas therefrom during normal engine operation, said afterburner having an axis and an outer duct of circular cross section with an inlet end attachable to an engine and an outlet end communicating with atmosphere and through which the afterburner gases are discharged to atmosphere to generate thrust, an inner body located at said outer duct inlet end and extending therefrom toward said outer duct outlet end but terminating substantially short thereof and being of circular cross section and concentrically positioned within said outer duct and coacting with said outer duct to define a total gas flow passage which is annular for the length of said inner body and of circular cross section downstream thereof, a mixture and flame control baffle of circular cross section located between said inner body and said outer duct and being of selected diameter with respect thereto to define a fuel-air mixing region of selected size with said inner body and a cooling gas passage within said total gas flow passage of selected size with said outer duct so that selected quantity flows of fuel free gas are passed through said mixing region and said cooling gas passage during said normal engine operation, said baffle extending from said outer duct inlet end downstream a selected distance beyond said inner body and terminating in an after end, a cooling liner of circular cross section defining a combustion zone and located within said outer duct to form a second cooling gas passage therewith within said total gas flow passage and extending from said baffle after end where said first and second cooling gas passages are in free communication to said outer duct outlet end and having perforations therein projecting downstream and placing said second cooling gas passage and said combustion zone into communication, separating means separating and defining a downstream directed passage between said baffle after end and said cooling liner and placing said first cooling gas passage into communication with said combustion zone so that a first portion of the cooling gas from said first cooling gas passage flows through said downstream directed passage downstream into said combustion zone along the inner surface of said cooling liner while a second portion flows into said second cooling gas passage from whence a first portion thereof flows through said downstream projecting perforations downstream into said combustion zone along the inner surface of said cooling liner while a second portion flows to atmosphere at said outer duct outlet end, fuel injection means positioned to introduce atomized fuel into the inlet end of said mixing region in a predetermined quantity to mix with the fuel free gas passing through said mixing region and form an unburned substantially stoichiometric fuel-air mixture flowing through said mixing region so that said baffle defines a first interface between said unburned stoichiometric fuel-air mixture flowing through said mixing region and the cooling gas flowing through said cooling gas passage, at least one ring-type flameholder positioned to intercept the flow of said unburned stoichiometric fuel-air mixture and establish a relatively stagnant area downstream thereof capable of supporting combustion and establish a combustion wave defining a second interface between the heated and burned gases resulting from the combustion of said stoichiometric fuel-air mixture and said unburned stoichiometric fuel-air mixture, means to position said flameholder a predetermined distance from said baffle after end so that said second interface intercepts said first interface immediately downstream of said baffle after end to insure that fuel introduced from said injection means adjacent to the baffle is burned upstream of the interception of said interfaces and so that the cooling gas which is passed into the remainder of said total gas flow passage from said cooling gas passage after end mixes with said heated and burned gases resulting from the combustion of said stoichiometric fuel-air mixture solely to provide a fuel free heated gas mixture to be discharged through said outer duct after end to atmosphere to generate thrust.

References Cited in the file of this patent
UNITED STATES PATENTS

| | | |
|---|---|---|
| 2,268,464 | Seippel | Dec. 30, 1941 |
| 2,639,578 | Pouchot | May 26, 1953 |
| 2,699,648 | Berkey | Jan. 18, 1955 |
| 2,794,317 | Brown | June 4, 1957 |
| 2,874,536 | Benson et al. | Feb. 24, 1959 |